US009792819B2

(12) United States Patent
Neff et al.

(10) Patent No.: US 9,792,819 B2
(45) Date of Patent: Oct. 17, 2017

(54) PROVISION OF AN EFFICIENT ENVIRONMENTAL MAP FOR A VEHICLE (71) Applicant: Bayerische Motoren Werke Aktiengesellschaft, Munich (DE)

(72) Inventors: Albrecht Neff, Unterschleissheim (DE); Marc Walessa, Munich (DE); Markus Hoerwick, Munich (DE); Oliver Kormann, Ilsfeld (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 14/926,272

(22) Filed: Oct. 29, 2015

(65) Prior Publication Data

US 2016/0049078 A1 Feb. 18, 2016

Related U.S. Application Data (63) Continuation of application No. PCT/EP2014/058325, filed on Apr. 24, 2014.

(30) Foreign Application Priority Data

Apr. 30, 2013 (DE) .................. 10 2013 207 904

(51) Int. Cl.
*G01C 21/32* (2006.01)
*G08G 1/16* (2006.01)
(Continued)

(52) U.S. Cl.
CPC .............. *G08G 1/16* (2013.01); *B60W 30/08* (2013.01); *B60W 40/02* (2013.01); *B60W 2050/065* (2013.01)

(58) Field of Classification Search
None
See application file for complete search history.

(56) References Cited

U.S. PATENT DOCUMENTS 5,677,836 A * 10/1997 Bauer .................. A47L 11/4011
701/23
2006/0023917 A1 2/2006 Dickmann et al.
(Continued)

FOREIGN PATENT DOCUMENTS

DE 198 45 568 A1 10/1999
DE 10 2005 026 386 A1 12/2006
(Continued)

OTHER PUBLICATIONS

International Search Report (PCT/ISA/210) issued in PCT Application No. PCT/EP2014/058325 dated Feb. 5, 2015, with English translation (six (6) pages).

(Continued)

*Primary Examiner* — Navid Ziaeianmehdizadeh
(74) *Attorney, Agent, or Firm* — Crowell & Moring LLP (57) ABSTRACT A method provides an environmental map for a vehicle, wherein the environmental map represents a section of the environment and includes cells which are each assigned to a subsection of the environment of the vehicle. Each cell is assigned occupancy information which is based on the probability of the presence of an object in the subsection assigned to the cell in question. The vehicle has a group of at least two driver assistance systems which are each configured to adopt an active and an inactive state and which, in the active state require occupancy information concerning sections of the environment which at least do not overlap completely. The method determines the driver assistance system(s) which is(are) in the active state; determines the section of the environment that the environmental map is intended to represent, on the basis of the section(s) about which the driver assistance system(s) in the active state require(s) occupancy information. In particular, the section of the environment that the environmental map is intended to represent includes the section(s) about which the driver (Continued)

assistance system or the driver assistance systems in the active state require(s) occupancy information when in the active state.

13 Claims, 6 Drawing Sheets

(51) Int. Cl.
*B60W 30/08* (2012.01)
*B60W 40/02* (2006.01)
*B60W 50/06* (2006.01)

(56) References Cited

U.S. PATENT DOCUMENTS

| 2006/0293856 | A1* | 12/2006 | Foessel | B60W 30/09 |
| | | | | 701/301 |
| 2008/0027591 | A1* | 1/2008 | Lenser | G05D 1/0251 |
| | | | | 701/2 |
| 2008/0122604 | A1* | 5/2008 | Hattori | B62D 15/0275 |
| | | | | 340/441 |
| 2009/0299547 | A1 | 12/2009 | Becker et al. | |
| 2010/0211244 | A1* | 8/2010 | Jeong | G01C 21/20 |
| | | | | 701/25 |
| 2013/0218467 | A1* | 8/2013 | Ogawa | G08G 1/096827 |
| | | | | 701/533 |
| 2014/0005933 | A1* | 1/2014 | Fong | G05D 1/0274 |
| | | | | 701/447 |
| 2014/0244142 | A1* | 8/2014 | Matsubara | B60W 10/184 |
| | | | | 701/116 |
| 2015/0003683 | A1* | 1/2015 | Grewe | H04N 5/23232 |
| | | | | 382/104 |
| 2015/0353083 | A1* | 12/2015 | Hasberg | G06K 9/00805 |
| | | | | 701/1 |

FOREIGN PATENT DOCUMENTS

| DE | 10 2006 061 390 A1 | 7/2008 |
| DE | 10 2007 039 374 A1 | 2/2009 |
| DE | 10 2010 011 629 A1 | 1/2011 |
| DE | 10 2009 040 295 A1 | 3/2011 |
| DE | 10 2010 018 994 A1 | 11/2011 |
| DE | 10 2011 113 016 A1 | 3/2012 |
| DE | 10 2011 078 615 A1 | 1/2013 |
| EP | 1 612 580 A1 | 1/2006 |
| EP | 2 028 072 A2 | 2/2009 |
| WO | WO 98/00728 A1 | 1/1998 |

OTHER PUBLICATIONS

German Search Report issued in counterpart Germany Application No. 10 2013 207 904.4 dated Dec. 13, 2013, with partial English translation (nine (9) pages).

Chinese-language Office Action issued in counterpart Chinese Application No. 201480024371.1 dated Mar. 3, 2017 with English translation (Sixteen (16) pages).

* cited by examiner

PROVISION OF AN EFFICIENT ENVIRONMENTAL MAP FOR A VEHICLE

CROSS REFERENCE TO RELATED APPLICATIONS

This application is a continuation of PCT International Application No. PCT/EP2014/058325, filed Apr. 24, 2014, which claims priority under 35 U.S.C. §119 from German Patent Application No. 10 2013 207 904.4, filed Apr. 30, 2013, the entire disclosures of which are herein expressly incorporated by reference.

BACKGROUND AND SUMMARY OF THE INVENTION

The invention relates to a method for providing an environmental map for a vehicle, to a corresponding device and to a corresponding computer program.

Motor vehicles have at their disposal a range of driver assistance systems which warn the driver about collisions and, if appropriate, attempt to avoid collisions by means of interventions. In order to make these functions available, knowledge of the environment of the vehicle is decisive for such driver assistance systems. In order to represent the environment for driver assistance systems it has already been proposed to examine subsections of the environment by use of sensors and to detect their occupancy or non occupancy, if appropriate with the specification of a probability of occupancy. The representation of the environment is then implemented by what is referred to as an environmental map (sometimes also referred to as a grid) that comprises cells which are each in turn assigned to the subsections. The information on the occupancy of the respective subsection is then assigned to the corresponding cell. The occupancy information which is assigned to a cell is typically acquired by a sensor system, for example an ultrasonic sensor or a radar system.

The environmental map which is acquired in this way with occupancy information can serve as a basis for highly automated driving.

The environmental map and the cells thereof with assigned occupancy probabilities are stored in the vehicle and, if appropriate, also in a central server after transmission.

DE 10 2006 061 390 A1 discloses an environment detection system in which a selection unit determines a selected spatial area of the environment about which information is preferably required. A control unit is able to actuate a sensor system in such a way that information about the selected spatial area is acquired. In this system, occupancy information is determined only for selected areas of an invariable environmental map.

DE 10 2011 113 016 A1 discloses a method for representing the surroundings of a vehicle in which surroundings data is acquired and stored in a hierarchical data structure. The detail level of areas of the data structure is determined as a function of properties of the objects identified there. The section of the environment of the vehicle which is represented by the data structure remains the same here, more details on areas of the environment in which objects have been identified are merely made available.

A disadvantage of the existing methods and systems for environmental maps is that they have to generate and process large quantities of data in real time despite the only limited computational and storage capacities in vehicles.

The object on which the invention is based is to provide a method with which environmental maps for vehicles can be generated and updated more efficiently in terms of computing and storage.

This and other objects are achieved by embodiments of the invention disclosed herein.

In one aspect, a method provides an environmental map for a vehicle, wherein the environmental map represents a section of the environment and comprises cells which are each assigned to a subsection of the section of the environment of the vehicle. Each cell is assigned occupancy information which is based on the probability of the presence of an object or of part of an object in the subsection assigned to the respective cell. The vehicle includes a group of at least two driver assistance systems which are each configured to assume an active state and an inactive state and which, in the active state, require occupancy information about sections of the environment of the vehicle which each at least do not overlap completely. The method determines the driver assistance system or systems which is/are in the active state; determines the section of the environment which the environmental map is intended to represent, on the basis of the section or sections about which the driver assistance system or systems requires/require occupancy information in the active state. The section of the environment which the environmental map is intended to represent comprises the section or sections about which the driver assistance system or systems requires/require occupancy information in the active state.

The method permits the environmental map to be configured in accordance with requirements. Only the areas of the environment about which information is actually required are represented by cells of the environmental map. The section of the environment which is represented by the environmental map is therefore not limited to permanently predefined geometric shapes. In the prior art these would typically be rectangular shapes. Instead, the section can assume any desired geometric shape. This has the advantage that sections of the environment which would not be considered by driver assistance systems also do not take up any capacities in the storage and processing of the environmental map. The capacities which become free in this way can be used to represent more precisely the sections of the environment about which occupancy information is actually required; for example by finer resolution (that is to say smaller subsections) and/or more informative but more computationally intensive signal processing. The existing storage and computing capacities are therefore used more efficiently.

The environmental map which is produced can be referred to as a "grid carpet". The sections about which the respective driver assistance systems require occupancy information (sometimes also referred to as partial grids) can have different and situationally variable edge lengths here as well as different and situationally variable sizes and shapes of the subsections (square, rectangular, logarithmic), and also different and situationally variable dimensions (1D, 2D, 2.5D, 3D). The cell size can increase exponentially within a section as the distance from the vehicle increases, with the result that in the immediate vicinity of the vehicle there is a higher cell density than at a large distance from the vehicle.

The sections about which the respective driver assistance systems require occupancy information can lie in a situationally planar fashion on the ground or be "upright" in space or curved.

The method can also comprise the following act of making available a storage structure for receiving occupancy information for the specific environmental map. The occupancy information can be stored in a data structure which is adapted to the environmental map. For example, information on the geometry of the environmental map can be stored in a first storage area. This information is, in particular, the description of the outer contour and, if appropriate, a generic mathematical or other general description of the situation and shape of the subsections to which the cells are assigned. The cells themselves can be created and identified in a second storage area, in particular with consecutive numbering. The cells can be in the form of entries in a database or storage structure. The entire database or storage structure can then represent the environmental map. For areas of the environment which do not lie in the represented section, no cells and therefore no storage space are provided. The method can also comprise the act of detecting occupancy information for subsections of the environment using sensors; storing the occupancy information in the storage structure which is made available.

In one further development, for each section about which a driver assistance system requires occupancy information in the active state, the subsections which lie in the respective section are also predefined. The method then also comprises the act of determining the subsections of the environment which the environmental map is intended to represent; and in areas in which sections about which driver assistance systems in the active state require occupancy information overlap, selecting those predefined subsections which are smallest in size (that is to say have the smallest surface content or the smallest circumference). In areas in which there is no overlap, subsections are typically selected which lie in these areas or are closest to them.

It will frequently be the case that driver assistance systems require different spatial resolutions of the occupancy information and therefore predefine the subsections for the section of the environment about which they require occupancy information. The predefinition of the subsections can be done by defining the geometric shape and position of the individual subsections or by use of a generic mathematical formula or mathematical description. Overlaps can occur during the determination of the section of the environment which the environmental map is intended to represent and which typically comprises at least the sections about which the active driver assistance systems require occupancy information. In other words, the sections of the environment about which the active driver assistance systems require occupancy information typically overlap. In these areas, the subsections which provide finer resolution, that is to say the smaller size for the subsections, are then selected. In this way, the most stringent requirement of the assistance systems of the resolution is taken into account.

Furthermore, in the case of overlaps of sections it may be the case that edges of sections or subsections of one assistance system do not coincide with the edges of sections or subsections of another assistance system. In this case there may be provision to maintain the residual subsections which are produced in the case of one section in order to maintain the regularity of the section which is covered and is to be continued (that is to say the section with the greater size of the subsections). Alternatively, the sections about which the driver assistance systems require occupancy information in the active state can also be defined in such a way that the boundaries of sections with relatively small subsections coincide with the edges of subsections of sections with relatively large subsections.

In one development, the determination of the occupancy information which is assigned to a cell of the environmental map is based on measurements of a first sensor and on measurements of a second sensor. The information which is received from two different sensors, typically from two different sensor systems, is therefore combined in an occupancy information item. For example a camera, an ultrasonic sensor, a radar system, a lidar system, an infrared sensor or similar sensors can be used as first or second sensors for the environment.

In another development, the method also comprises the act of receiving the direction of movement of the vehicle; wherein the determination of the section of the environment which the environmental map is intended to represent is additionally dependent on the received direction of movement of the vehicle. Driver assistance systems can be configured for various directions of movement of the vehicle, for example for forward travel and for reverse travel. Therefore, such a driver assistance system generally requires occupancy information of sections of the environment in front of the vehicle and sections of the environment behind the vehicle. However, the driver assistance system does not require the occupancy information for forward travel at the same time as the occupancy information for reverse travel. Sections of the environment which are required only for a specific direction of movement of the vehicle, for example for reverse travel, may not be included in the environmental map in the case of forward travel of the vehicle. The environmental map which is produced in this way then does not represent the sections of the environment which are not required for the direction of movement at that time.

In a refinement, the method comprises, in particular, the determination of the geometric shape of each subsection, in particular as a function of the received direction of movement. The adaptation of the environmental map can therefore also take place in such a way that the subsections of the environment are adapted to the direction of the movement. All the subsections of the prior art typically always have the same geometric shape, for example each subsection is square or rectangular. In the method according to the invention, it is possible to provide instead that subsections for one direction of movement are given one geometric shape and for another direction of movement are given a different geometric shape. In the case of forward travel, it is therefore possible, for example, for the environment to be divided into elongate rectangles as subsections, while in the case of reverse travel the environment is divided into squares. An application for this would be, for example, in the case of parking, in which relatively fine division of the environment in the reverse direction is particularly helpful, since the driver's view in the reverse direction is frequently more restricted than in the forward direction.

In one development, the method also comprises the act of receiving the steering angle of wheels of the vehicle; wherein the determination of the section of the environment which the environmental map is intended to represent is additionally dependent on the received steering angle of the vehicle. Such a procedure is appropriate, in particular, when a driver assistance system requires, for example, occupancy information for the section of the future travel profile. Instead of selecting the represented section of the environment in such a way that all the possible corners are covered by the environmental map, depending on the steering angle (and therefore cornering) only that section of the environment is represented which is travelled through in the case of the steering angle at that time, if appropriate somewhat widened for unpredictable deviations during the cornering. The section of the environment can be, for example, a rectangle which is bent in accordance with the steering angle. In this way, the represented section of the environment is reduced in size to the area which is actually relevant for driver assistance systems. The computing resources and storage capacity which are present in the vehicle can be used more efficiently. In one development, the method can also comprise the act of determining the geometric shape of each subsection, in particular as a function of the received steering angle. For example, the subsections can be curved rectangles in accordance with the future travel path in the case of the steering angle at that time and can adopt the geometric shape of the represented section in a reduced form. In this way, a simplified assignment of cells of the environmental map to the subsections is made possible.

In another development, the method also comprises the act of detecting objects in the environment of the vehicle; wherein the determination of the section of the environment which the environmental map is intended to represent is additionally dependent on the detected objects in the environment of the vehicle. In this way it is made possible for the represented section of the environment to be enlarged where objects are located. If, for example, part of an object is detected by the represented section and, for example, the object is detected as another road user, or this is suspected, the represented section of the environment can be expanded, with the result that this road user is located completely in the represented section of the environment. This permits the assistance systems which are concerned with other road users to better track and analyze the road users which are otherwise not completely represented. This concept can also be transferred to the geometric shape of each subsection.

The method then also comprises the act of determining the geometric shape of each subsection, in particular as a function of detected objects in the environment of the vehicle. For example, the subsections can be selected to be smaller in the section of the environment in which an object has been detected, in order to permit the classification or tracking of the object more precisely. This permits the use of computing capacities and storage capacities where driver assistance systems profit particularly therefrom.

In another development, the environmental map comprises at least two planes, wherein each plane represents a section of the environment and comprises cells which each represent a subsection of the respective section of the environment of the vehicle, wherein each cell is assigned occupancy information which is based on the probability of the presence of an object or of part of an object in the subsection which is assigned to the respective cell. The method also comprises the act of determining the occupancy information for each cell, in particular wherein the occupancy information for cells of a plane is based on measurements of one by at least two (different) sensor systems. This makes it possible for a section of the environment to be represented repeatedly, for example twice, in each case in a plane. This can serve to separate occupancy information from sensors. For example, the occupancy information from ultrasonic sensors can be assigned to cells of a first plane, and occupancy information relating to the same section of the environment from camera sensors can be assigned to a second plane. Furthermore, the occupancy information of groups of sensors can be assigned to planes. The cells of a specific plane can therefore be allocated the combination of occupancy information items from at least two sensors. Furthermore, this permits occupancy information of the same sensor to be assigned in cells of different planes. The occupancy information can therefore be used repeatedly. The combination and selection of occupancy information of various sensors for one plane can therefore fulfill the requirements which a driver assistance system makes of the environmental map.

In this respect it is possible to provide that, in the method, occupancy information from a first group of sensors whose generation takes approximately the same first time period is to be assigned to the cells of a first plane. Occupancy information from a second group of sensors whose generation takes, in turn, a second time period is assigned to the cells of a second plane. In this way, given limited computational capacities and storage capacities it is possible to make gradations with respect to the real time provision of occupancy information from various sensors. Data from those sensors which require a relatively long processing time is not made available as frequently as the data of those sensors which require a relatively short processing time.

In another aspect, a device includes electronic processing unit and at least one interface with a sensor system, wherein the device is configured to carry out one of the methods described above. The electronic processing unit can be a computer, a microcontroller, dedicated circuits or the like. The electronic processing unit can be configured in terms of programming technology to execute one of the illustrated methods.

In another aspect, a computer program is configured to cause, when it is executed, a computer to execute one of the presented methods. For this purpose, the computer program can include machine readable instructions.

Other objects, advantages and novel features of the present invention will become apparent from the following detailed description of one or more preferred embodiments when considered in conjunction with the accompanying drawings.

BRIEF DESCRIPTION OF THE DRAWINGS

Identical reference symbols relate to corresponding elements in all the figures.

DETAILED DESCRIPTION OF THE DRAWINGS

FIGS. 1 to 5 show schematic views of environmental maps for a vehicle 1.

Figure 1:
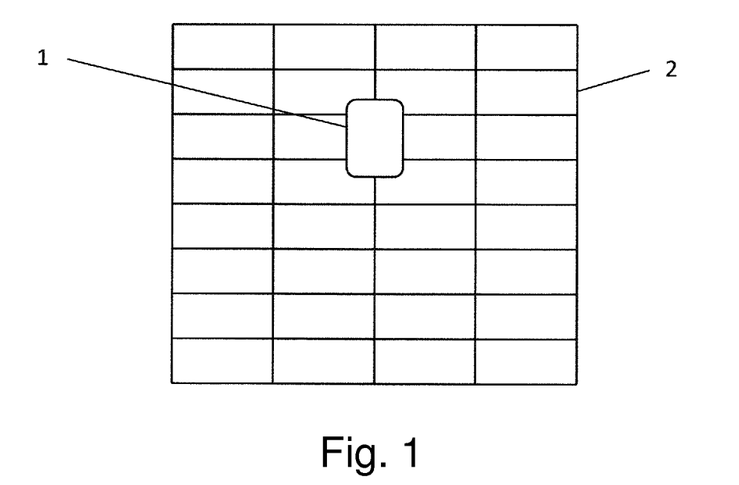
FIGS. 1 to 4 are schematic views of sections of the environment about which active driver assistance systems require occupancy information.

FIG. 1 is a schematic view of that section 2 of the environment about which an active collision warning system for traffic to the side and traffic to the rear requires occupancy information. The subsections are also shown.

Figure 2:
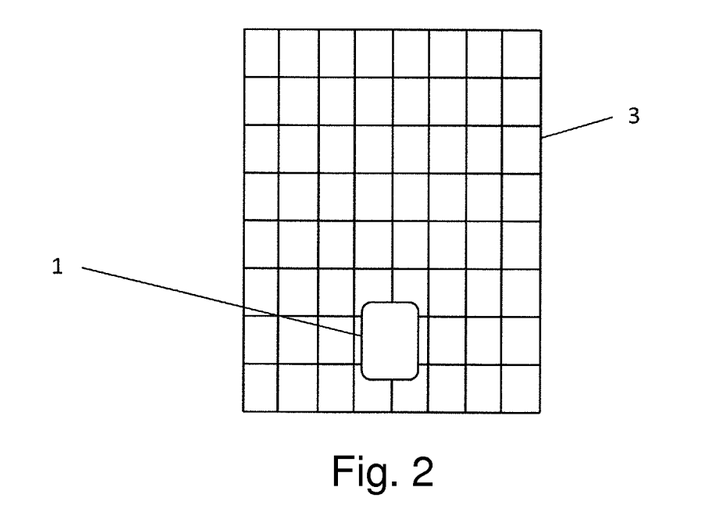

FIG. 2 is a schematic view of that section 3 of the environment about which an active parking assistant requires occupancy information. The subsections, which are smaller than those of the section 2, shown in FIG. 1, for a collision warning system, are also shown.

Figure 3:
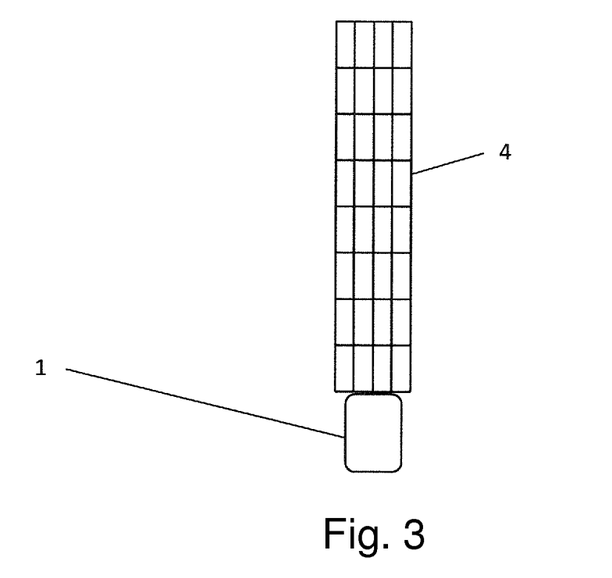

FIG. 3 is a schematic view of the section 4 of the environment about which an active lane keeping assistant for freeways requires occupancy information. The subsections, which are smaller than those of section 2, shown in FIG. 1, for a collision warning system and those of section 3, shown in FIG. 2, for the parking assistant, are also shown.

Figure 4:
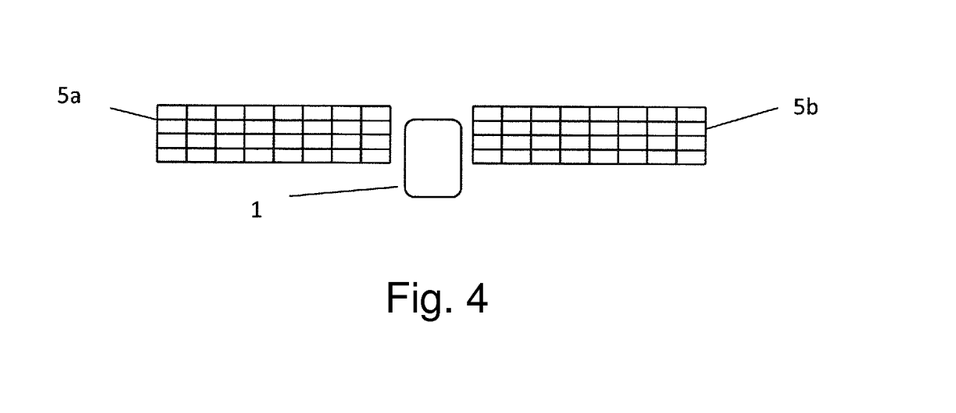

FIG. 4 is a schematic view of those sections 5a and 5b of the environment about which an active side view assistant requires occupancy information. The subsections, which are smaller than those of section 2, shown in FIG. 1, for a collision warning system and those of section 3, shown in FIG. 2, for the parking assistant, are also shown. The sections 5a and 5b are illustrated here in a logically divided fashion, but can also be in the form of one section.

Figure 5:
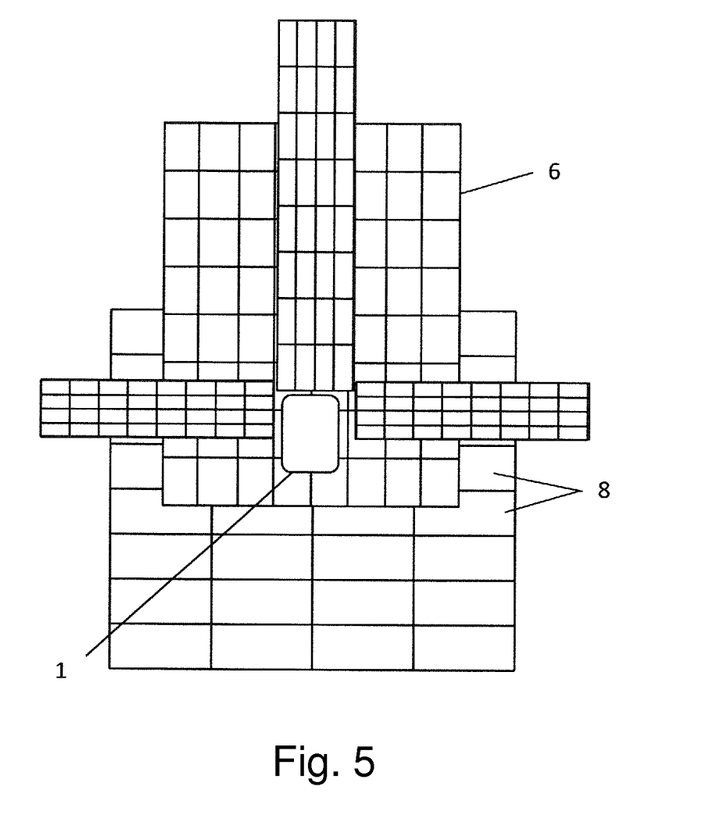
FIG. 5 is a schematic view of a section of an environment which is represented by an environmental map, according to one exemplary embodiment.

FIG. 5 shows, on the basis of the examples in FIGS. 1 to 4, a section 6 of the environment which is represented by an environmental map, according to one exemplary embodiment. In this example, the collision warning system for traffic to the side and traffic to the rear, the parking assistant, the lane keeping assistant for freeways and the side view assistant of a vehicle are activated simultaneously. For these activated driver assistance systems, that section of the environment which the environmental map is intended to represent, here the section 6, is determined. This is done by transferring the sections and subsections which are predefined by the driver assistance systems. The section 6 of the environment is bounded by twenty edges and is formed by subsections of four different sizes. In the area in which the section of the collision warning system overlaps with that of the parking assistant, the size of the subsections is predefined by the size of the subsections of the parking assistant, since this last size is the smaller one. In this context, subsections of the collision warning system are covered only partially, a number of them are provided, by way of example, with the reference number 8. These residual subsections (that is to say the areas of the subsections of the collision warning system which are not covered) are, however, maintained in order to maintain the regularity of the subsections of the collision warning system. Therefore, in the present example in FIG. 5, the sections and also the geometric shape and position of the subsections are transferred from the predefinitions of the individual driver assistance systems, wherein in the case of an overlap the resolution is decisive for determining the predefinitions of which assistance system are decisive. In the present example, the environmental map is no longer predefined by the sections of the driver assistance systems.

Figure 6:
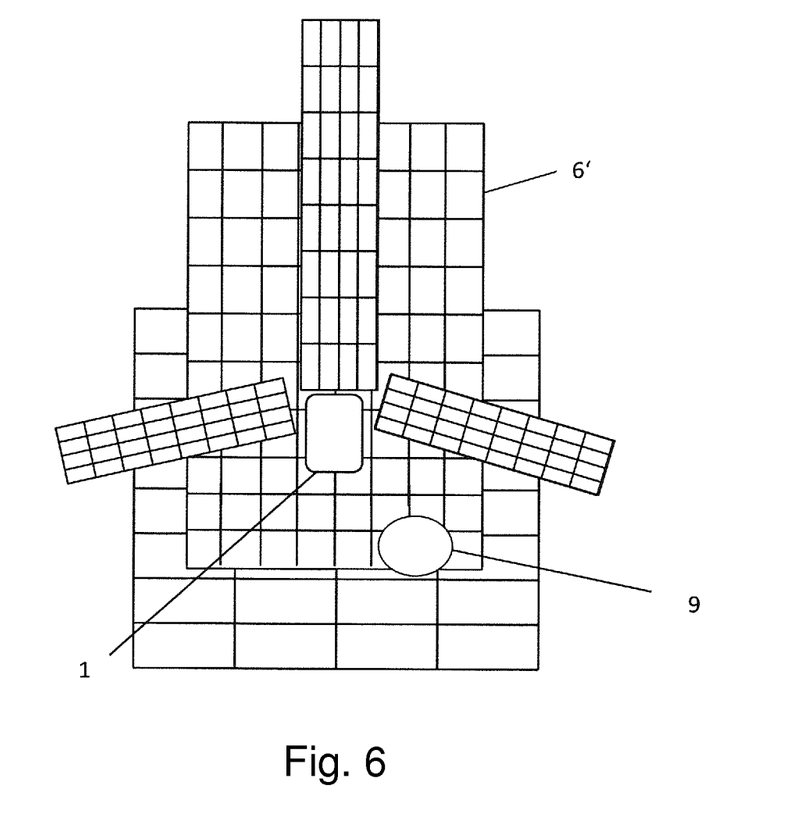
FIG. 6 is a schematic view of an environmental map for a vehicle in the case of reverse travel of the vehicle according to one exemplary embodiment.

FIG. 6 shows a schematic view of a situational adaptation of the section 6', represented by the environmental map, of the environment according to one exemplary embodiment, based on the example in FIG. 5. In the example shown in FIG. 6, an obstacle 9, for example a tree, is detected in the area to the rear of the vehicle 1. The subsections in this area have been adapted on the basis of this detection. Since this detection is mainly significant for the parking assistant, the section about which the parking assistant requires occupancy information in the active state is made larger, specifically in the direction of the obstacle 9. For this purpose, two new rows of subsections are defined, the size of which differs slightly from that of the other subsections of the section of the parking assistant. This change in size of the subsections can also be executed logarithmically.

At the same time, in the example shown in FIG. 6, the vehicle 1 is traveling in reverse. For this purpose, the sections for the side view assistant are rotated in the angular orientation compared to the vehicle 1 with respect to the area to the rear of the vehicle.

Figure 7:
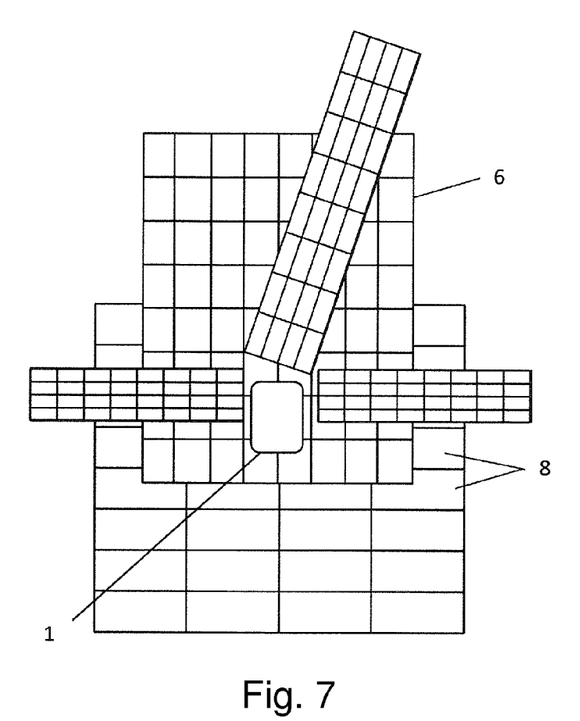
FIG. 7 is a schematic view of an environmental map for a vehicle in the case of cornering according to one exemplary embodiment.

FIG. 7 shows a schematic view of an environmental map for a vehicle during cornering according to one exemplary embodiment. In this example, the steering angle of the vehicle is detected. The section of the environment about which the lane keeping assistant requires occupancy information is rotated in accordance with the driving path to be expected. In FIG. 7, this section is only rotated, but a profile along the path actually traveled on, that is to say along an arc, would also be contemplated.

Figure 8A:
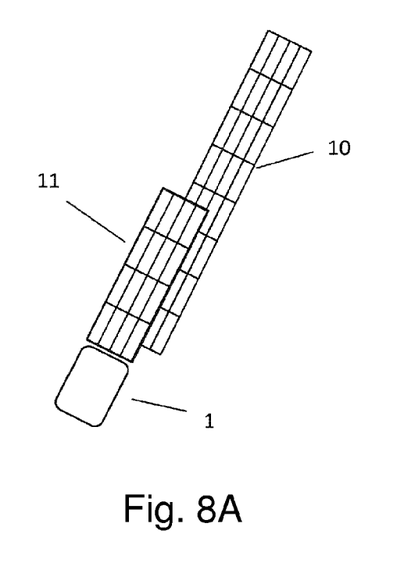
FIGS. 8A and 8B are schematic views of an environmental map divided into planes, according to one exemplary embodiment.

FIG. 8a demonstrates, in schematic form, the division of the environmental map into planes according to one exemplary embodiment. If the lane keeping assistant is active, occupancy information is required by it for a section of the environment lying ahead. This occupancy information is acquired in the present example in FIG. 8a using radar sensors and stereo video cameras. The data from radar sensors extends further than that from stereo video cameras. In FIG. 8a, the section which can be represented by radar data is denoted by the reference number 10. The section which can be represented by the stereo cameras is denoted by the reference number 11. For the section 10, the sensor data supplies only 2D information, while it supplies 3D information for the section 11, that is to say both the occupancy probability and altitude information for each cell. However, the measurement of the stereo camera does not extend as far as the measurements of the radar. This is indicated in FIG. 8a by the fact that section 11 is shorter. Both sections lie in different planes and, for each plane, there is an environmental map with its own cells to which the occupancy probabilities are assigned. Data of different sensors are placed in different planes.

Figure 8B:
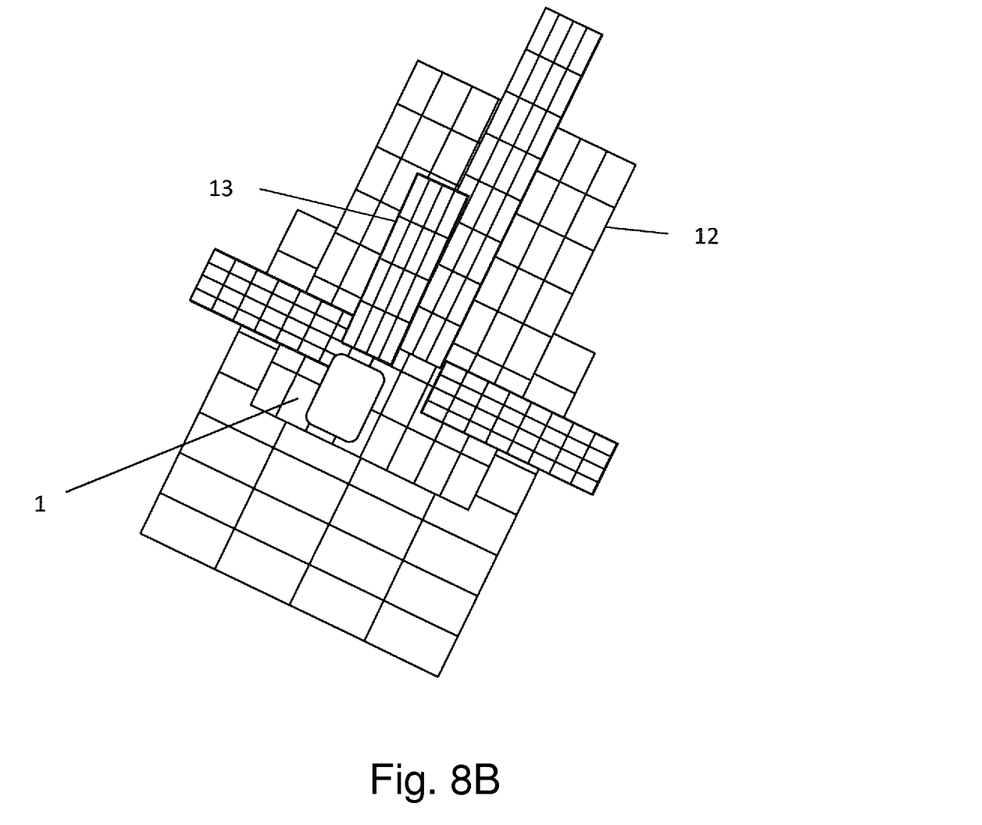

FIG. 8b shows the total context of the resulting environmental map with two planes which comprises the sections shown in FIG. 8a. In the first plane (illustrated here as lying at the bottom), the section 12 which comprises the section 10 shown in FIG. 8a is represented. The second plane 13 (represented here as lying at the top) comprises the section 11 from FIG. 8a. During the determination of the sections in the individual planes, the previously presented method is applied, with the result that only those sections of the environment for which occupancy information is required are represented. In addition, sensor data from various sensors for the same sections or for at least overlapping sections are separated into different planes of the environmental map.

If measurement data from two sensors is also present for the section denoted by the reference number 3 in FIG. 2, this measurement data can also be represented in the second plane. In this context, the two sections for the lane keeping assistant and the parking assistant overlap and are combined to form one section, as explained above. An example of two different sensors for the parking assistant can be ultrasonic sensors with 2D data and stereo video data, in particular with 2.5D data.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:
1. A method for providing a map, the method comprising:
configuring an environmental map for a vehicle equipped with a group of at least two driver assistance systems, each driver assistance system being configured to adopt an active and an inactive state, wherein the environmental map represents a section of an environment and includes cells which are each assigned to a subsection of the environment of the vehicle, each cell is assigned occupancy information based on a probability of a presence of an object or part thereof in the subsection assigned to the respective cell, and in the active state, a first of the two driver assistance systems requires occupancy information concerning a first section of the environment and a second of the two driver assistance systems requires occupancy information concerning a second section of the environment, wherein the first and second sections at least do not overlap completely;

determining a respective driver assistance system or systems which are in the active state;

determining the section of the environment which the environmental map is to be configured to represent based on the first and second sections about which the driver assistance systems require occupancy information in the active state;

configuring the environmental map for the determined section of the environment to comprise only the first and second sections about which the driver assistance systems require occupancy information in the active state, whereby the section of the environment is not limited to permanently predefined geometric shapes, so that sections of the environment not considered by the driver assistance systems do not consume any storage and processing resources, and the at least two driver assistance systems are selected from the group consisting of a front collision warning system, a rear collision warning system, an active parking assistance system, a lane keeping assistance system, and a side view assistance system.

2. The method according to claim 1, wherein for each section about which the driver assistance system requires occupancy information in the active state, subsections which lie in the respective section are predefined, the method further comprising the acts of:

determining the subsections of the environment which the environmental map is configured to represent; and in areas in which sections about which the driver assistance systems in the active state require occupancy information overlap, selecting the predefined subsections which are smallest in size.

3. The method according to claim 1, further comprising the act of:

determining the occupancy information which is assigned to a cell of the environmental map based on measurements of first and second sensors.

4. The method according to claim 1, further comprising the acts of:

receiving a direction of movement of the vehicle, wherein the determining of the section of the environment which the environmental map is configured to represent is additionally dependent on the received direction of movement of the vehicle; and determining a geometric shape of each subsection as a function of the received direction of movement.

5. The method according to claim 4, further comprising the act of:

receiving a steering angle of the vehicle, wherein the determining of the section of the environment which the environmental map is configured to represent is additionally dependent on the received steering angle of the vehicle; and determining the geometric shape of each subsection as a function of the received steering angle.

6. The method according to claim 5, further comprising the acts of:

receiving a speed of the vehicle, wherein the determining of the section of the environment which the environmental map is configured to represent is additionally dependent on the received speed of the vehicle; and determining the geometric shape of each subsection as a function of the received speed.

7. The method according to claim 6, further comprising the acts of:

detecting objects in the environment of the vehicle, wherein the determination of the section of the environment which the environmental map is configured to represent is additionally dependent on the detected objects in the environment of the vehicle; and determining the geometric shape of each subsection as a function of the detected objects in the environment of the vehicle.

8. The method according to claim 1, further comprising the act of:

receiving a steering angle of the vehicle, wherein the determining of the section of the environment which the environmental map is configured to represent is additionally dependent on the received steering angle of the vehicle; and determining the geometric shape of each subsection as a function of the received steering angle.

9. The method according to claim 1, further comprising the acts of:

receiving a speed of the vehicle, wherein the determining of the section of the environment which the environmental map is configured to represent is additionally dependent on the received speed of the vehicle; and determining the geometric shape of each subsection as a function of the received speed.

10. The method according to claim 1, further comprising the acts of:

detecting objects in the environment of the vehicle, wherein the determination of the section of the environment which the environmental map is configured to represent is additionally dependent on the detected objects in the environment of the vehicle; and determining the geometric shape of each subsection as a function of the detected objects in the environment of the vehicle.

11. The method according to claim 1, wherein the environmental map comprises at least two planes, each plane represents a section of the environment and comprises cells which each represent a subsection of the respective section of the environment of the vehicle, each cell is assigned occupancy information based on a probability of a presence of an object or part thereof in a subsection assigned to the respective cell, and the method further comprising the act of:

determining the occupancy information for each cell, wherein the occupancy information for cells of a respective plane is based on measurements by one of at least two sensor systems.

12. A device for providing an environmental map of a vehicle, wherein the environmental map represents a section of an environment and includes cells which are each assigned to a subsection of the environment of the vehicle, each cell is assigned occupancy information based on a probability of a presence of an object in the subsection assigned to the respective cell, the device comprising:

at least two driver assistance systems, each driver assistance system being configured to adopt an active and an inactive state and which, in the active state, a first of the two driver assistance systems requires occupancy information concerning a first section of the environment and a second of the two driver assistance systems requires occupancy information concerning a second section of the environment, wherein the first and second sections at least do not overlap completely, an electronic processing unit configured to interface with a sensor system, wherein the electronic processing unit executes a program to:

determine a respective driver assistance system or systems which are in the active state; and determine the section of the environment which the environmental map is to be configured to represent based on the first and second sections about which the driver assistance systems require occupancy information in the active state, configure the environmental map for the determined section of the environment to comprise only the first and second sections about which the driver assistance systems require occupancy information in the active state, whereby the section of the environment is not limited to permanently predefined geometric shapes, so that sections of the environment not considered by the driver assistance systems do not consume any storage and processing resources, and the at least two driver assistance systems are selected from the group consisting of a front collision warning system, a rear collision warning system, an active parking assistance system, a lane keeping assistance system, and a side view assistance system.

13. A non-transitory computer readable medium having stored thereon program code sections which, when executed, carry out a method for providing an environmental map for a vehicle, wherein the environmental map represents a section of an environment and includes cells which are each assigned to a subsection of the environment of the vehicle, each cell is assigned occupancy information based on a probability of a presence of an object or part thereof in the subsection assigned to the respective cell, and the vehicle is equipped with a group of at least two driver assistance systems, each driver assistance system being configured to adopt an active and an inactive state and which, in the active state, a first of the two driver assistance systems requires occupancy information concerning a first section of the environment and a second of the two driver assistance systems requires occupancy information concerning a second section of the environment, wherein the first and second sections at least do not overlap completely, the method executed by the program code sections comprising the acts of:

determining a respective driver assistance system or systems which are in the active state; and determining the section of the environment which the environmental map is to be configured to represent based on the first and second sections about which the driver assistance systems require occupancy information in the active state, configuring the environmental map for the determined section of the environment to comprise only the first and second sections about which the driver assistance systems require occupancy information in the active state, whereby the section of the environment is not limited to permanently predefined geometric shapes, so that sections of the environment not considered by the driver assistance systems do not consume any storage and processing resources, and the at least two driver assistance systems are selected from the group consisting of a front collision warning system, a rear collision warning system, an active parking assistance system, a lane keeping assistance system, and a side view assistance system.

* * * * *